Sept. 27, 1932.  W. J. BURCHETT  1,879,600
PROJECTING DEVICE
Filed Dec. 9, 1929   5 Sheets-Sheet 1
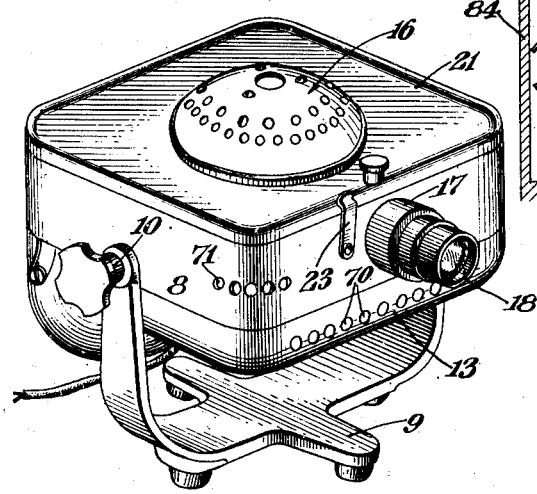
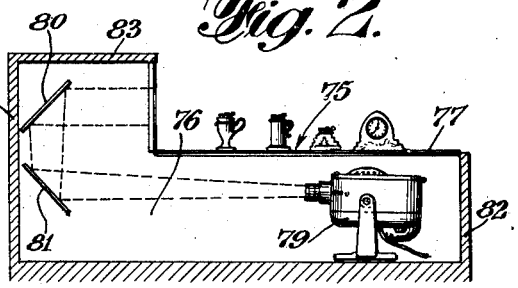
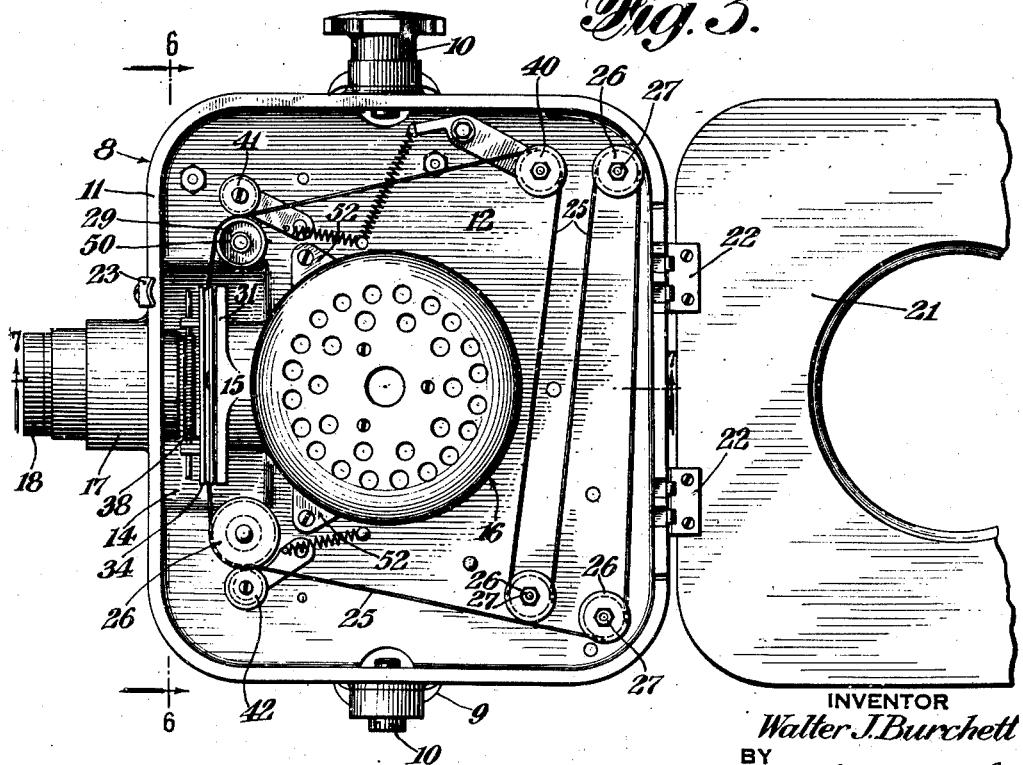
INVENTOR
Walter J. Burchett
BY
ATTORNEYS

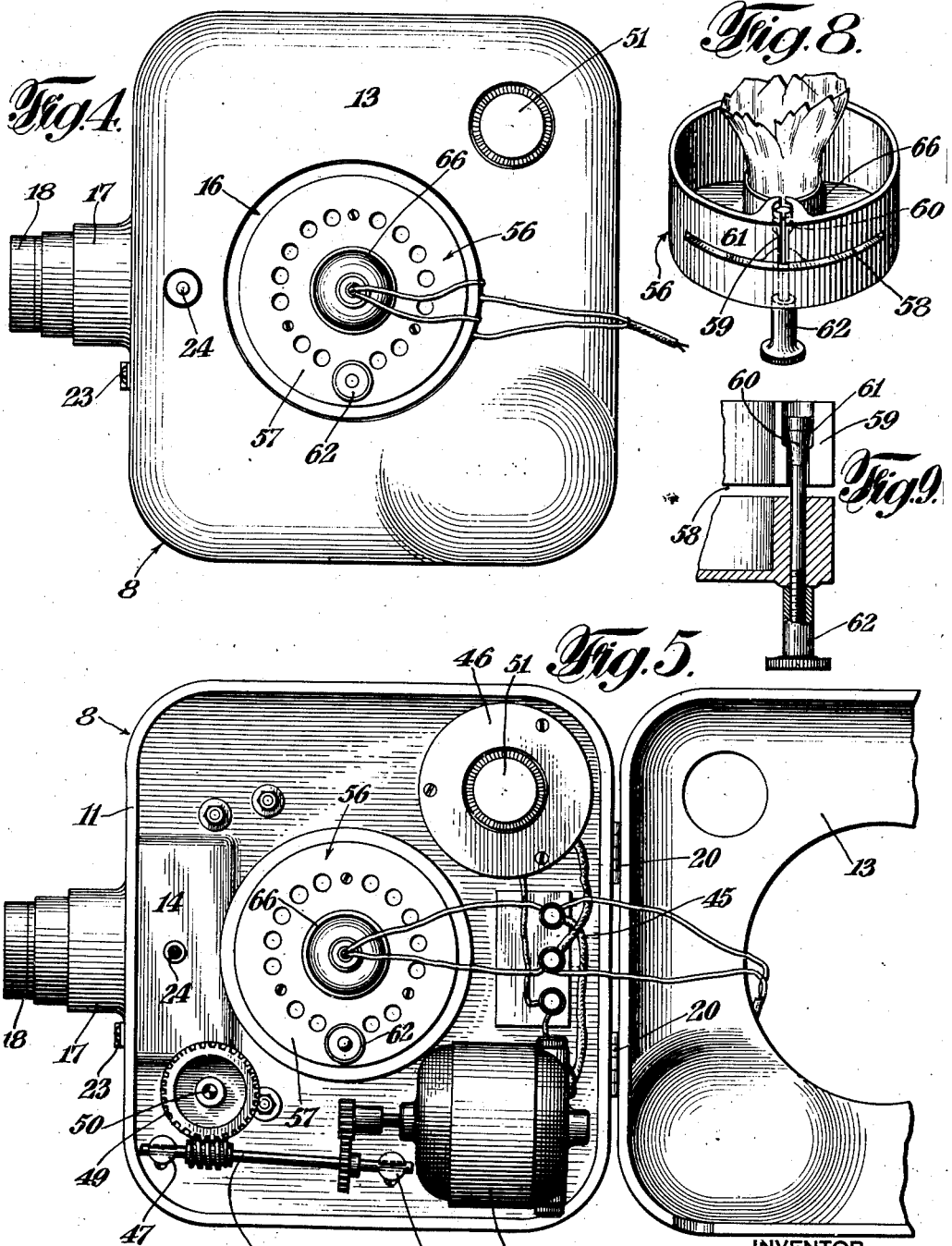

Sept. 27, 1932.  W. J. BURCHETT  1,879,600
PROJECTING DEVICE
Filed Dec. 9, 1929  5 Sheets-Sheet 3
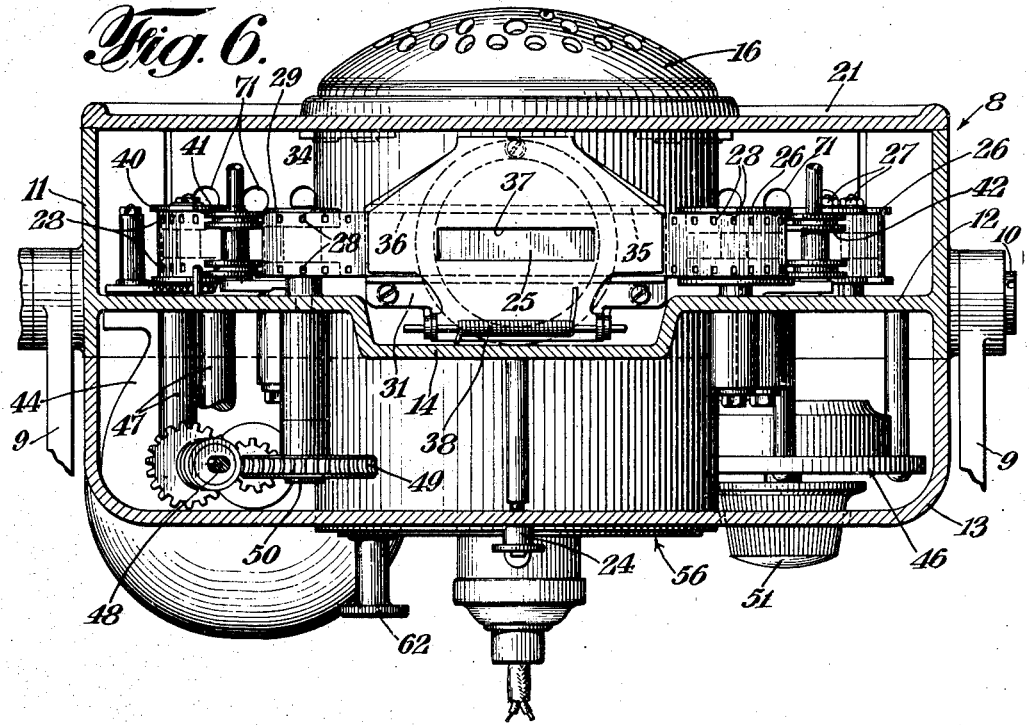
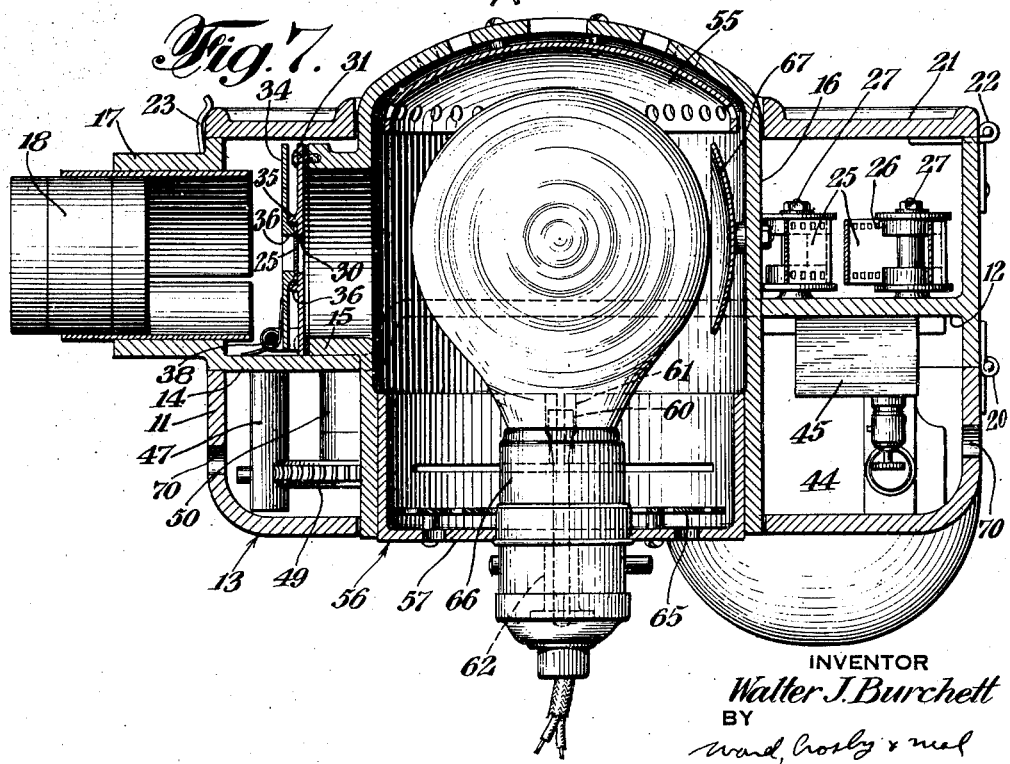
INVENTOR
Walter J. Burchett
BY
Ward, Crosby & Neal
ATTORNEYS Sept. 27, 1932.                     W. J. BURCHETT                     1,879,600
                                    PROJECTING DEVICE
                                  Filed Dec. 9, 1929          5 Sheets-Sheet 4
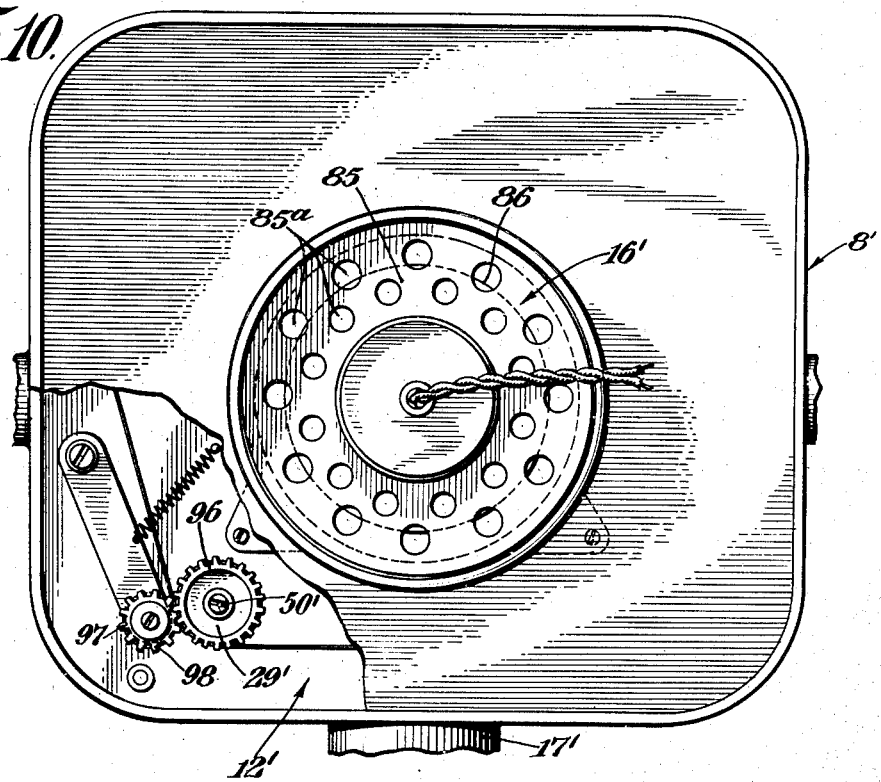
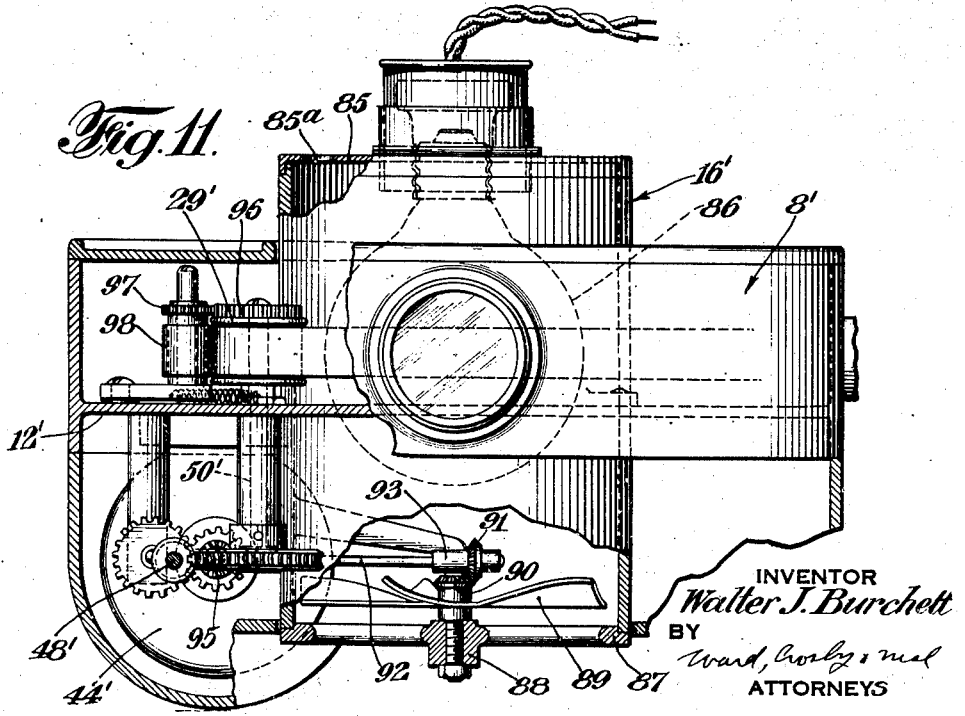
INVENTOR
Walter J. Burchett
BY
Ward, Crosby & Neal
ATTORNEYS

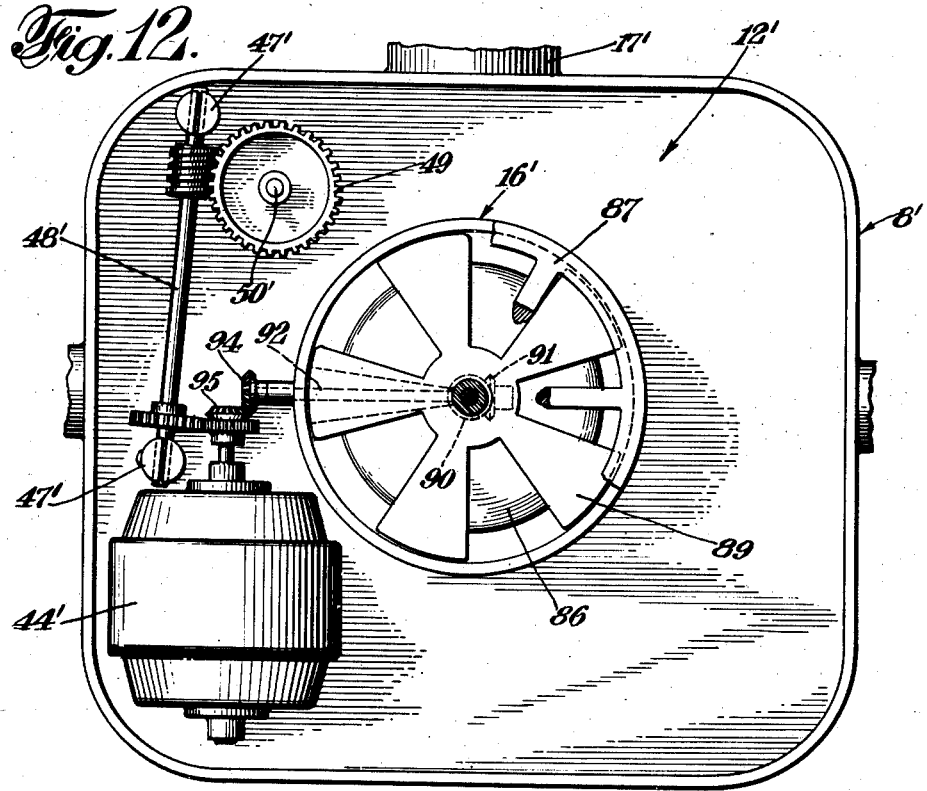
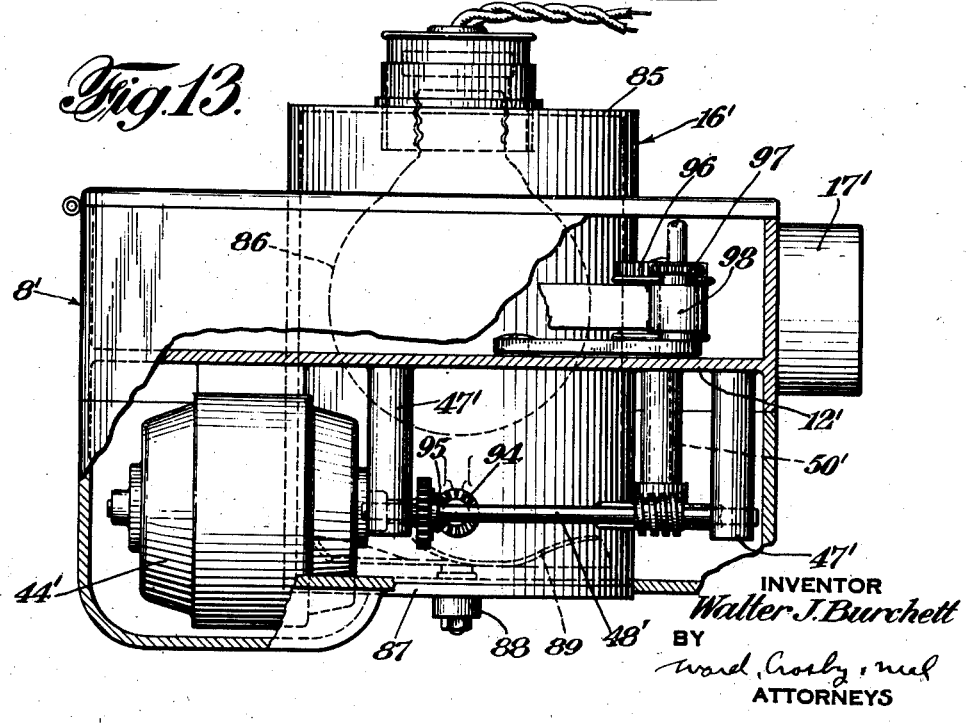

Patented Sept. 27, 1932

1,879,600

UNITED STATES PATENT OFFICE

WALTER J. BURCHETT, OF EAST ORANGE, NEW JERSEY, ASSIGNOR TO ART METAL WORKS, INC., OF NEWARK, NEW JERSEY, A CORPORATION OF NEW JERSEY

PROJECTING DEVICE

Application filed December 9, 1929. Serial No. 412,674.

This invention relates to improvements in projecting devices of the kind adapted to automatically display pictures, advertising matter and the like by causing the matters displayed to travel successively across a screen.

The objects of the invention include the provision of a compact and durable projecting device of inexpensive construction, preferably in a form convenient for portable use and so mounted that the elevation of the projected light beam may be adjusted to project the image directly or indirectly upon screens located in any desired position. The invention also preferably embodies the highly efficient and compact lamp ventilating arrangement hereinafter disclosed, together with an improved arrangement of the operating mechanism within its housing.

Various further and more specific objects, features and advantages will clearly appear from the detailed description given below, taken in connection with the accompanying drawings which form a part of this specification and illustrate, merely by way of example, one embodiment of the apparatus of the invention.

The invention consists in such novel features, arrangements and combinations of parts as may be shown and described in connection with the projector herein disclosed by way of example only and as illustrative of a preferred embodiment.

In the drawings, Fig. 1 is a perspective view of the projecting device;

Fig. 2 shows one of its uses in connection with a display stand;

Fig. 3 is a top plan view of the device with the top cover thrown back, to show the course of the film and structural parts;

Fig. 4 is a bottom plan view of the device with the supporting base removed;

Fig. 5 shows a bottom plan view of the device with the bottom cover thrown back, to show the motor, rheostat and film feed driving mechanism;

Fig. 6 is a vertical front elevational section in the line 6—6 of Fig. 3;

Fig. 7 is a central vertical section on the line 7—7 of Fig. 3;

Fig. 8 is a perspective view of the removable end of the lamp housing;

Fig. 9 is a part section through the clamping means for adjustably holding the removable end in place;

Fig. 10 is a top plan view of a modified form with a part of the upper cover broken away;

Fig. 11 is a part elevation and a part sectional view of the modified form;

Fig. 12 is a bottom view with parts broken away, of the modified form; and

Fig. 13 is a view taken at right angles to the view in Fig. 11.

The projecting device in the embodiment shown in Figs. 1 to 9 comprise a main box-like casing 8 (Fig. 1) pivotally and adjustably mounted on a base 9 by screws 10, one of which is provided with a hand wheel for frictionally clamping the casing in adjusted position.

The casing 8 comprises a main generally rectangular body portion 11 (Figs. 1, 3, 5, 6 and 7) provided with a cross web 12 spaced a short distance from the lower edge of the main body portion to provide in combination with the bottom cover 13 a space for housing the motor and other parts. The central forward portion of the web 12 is depressed as at 14 into line with the lower edge of the body portion 11 to receive the projector tube 15 of the lamp housing 16, thereby permitting a construction of short vertical dimension.

The forward end of the body portion 11 is provided with a tubular projector tube 17 in which projecting lenses 18 of any suitable character are held by any suitable means.

The bottom cover 13 is connected to the body portion 11 by any suitable hinge construction 20 to permit it to be thrown back as shown in Fig. 5.

The top cover 21 is connected to the body portion 11 by a suitable hinge construction 22 permitting it to be thrown back as shown in Fig. 3, to permit access to the film and other parts. The cover 21 may be held in closed position by clips 23. The lower cover is held in place by a screw 24 as shown in Figs. 5 and 6.

In the embodiment disclosed the film 25 is shown as a continuous strip supported on spools 26 rotatable on studs 27 projecting from the upper face of the cross web 12. The spools are preferably provided with flanges to guide the ribbon and hold it on the spools.

The film is provided with sprocket openings 28 along its edges with which cooperate sprocket wheels 29 to feed the film across a slot 30 in a plate 31 secured against the front end of the tubular projector tube 15 of the lamp housing 16. The plate 31 is provided with guide flanges 35 which guide the film and space the flanges 36 on a gate 34 hinged to ears on the plate 31 to form a passageway for the film between the flanges 36 and plate 31. The flanges 36 surround a slot 37 in the gate 34. The gate 34 is spring pressed by a spring 38 as shown.

The film is held taut by a spring drawn pivotally mounted tension roller 40. A spring drawn roller 41 presses the film into engagement with the sprocket wheels. Another spring drawn roller 42 presses the film between the guide flanges of one of the rollers 26 to insure the correct vertical position of the film where it enters the passageway formed by the plate 31 and gate 34.

Secured to the lower face of the cross web 12 are the motor housing 44, the terminal binding post plate 45, the rheostat 46 and the supports 47 for the worm shaft 48 which is suitably geared to the motor shaft and drives a worm gear 49 mounted on a shaft 50 extending through the cross web 12 on which shaft the sprocket wheels 29 are suitably secured.

The bottom cover 13 is provided with an opening through which the hand wheel 51 of the rheostat 46 extends.

The bottom cover 13 and the top cover 21 are each provided centrally with a large opening through which the ends of the lamp-housing 16 project. The lamp-housing 16 is provided with ears 52 by means of which it may be secured to the cross web 12, through which it projects.

The lamp-housing 16 is substantially tubular in form and has an integral upper dome-shaped end suitably perforated as shown for ventilating purposes. Secured to and spaced from said end is a dome-shaped baffle plate 55 provided with a circular series of ventilating apertures.

The lower end 56 of the housing 16 is removable and is constructed as shown in Figs. 7, 8 and 9 to permit it to be readily removed or clamped in position. It consists essentially of a short cylinder with a circumferential saw-cut 58 and a cross saw-cut 59 to provide an expansible portion with which a wedge bolt 60 supported in a lug 61 cooperates to expand this portion of the cylinder against the wall of the lamp-housing 16 as the bolt is drawn down by a nut 62.

A perforated baffle plate 65 is secured in spaced relation to the perforated end 57.

The socket of the lamp 66 is suitably secured in an opening in the perforated end 57.

A spherical reflector 67 is secured to the lamp-housing in rear of the lamp for the usual purposes of reflecting light through the film.

It is apparent that my construction provides a light and durable projecting device in which the parts are readily accessible and in which the film is protected against heat from the lamp. The film extends around the lamp-housing as shown in Fig. 3 which on account of its mounting and the ventilating system shown will radiate very little heat against the film.

The lower cover is also preferably provided with ventilating openings 70, Figs. 1 and 7, to cool the motor, rheostat and working parts below the cross web 12.

The portion housing the film is also preferably ventilated by apertures 71 as shown in Fig. 1.

In Fig. 2 there is shown one of the uses to which my invention is applicable. The display stand 75 may comprise side members 76, a cross member or shelf 77 upon which articles may be set and a vertical framing portion 78 in which there may be a screen or window glass as desired, upon which or through which may be seen images of advertising matter projected from a projecting apparatus 79, and angularly disposed mirrors 80 and 81 as shown. In this use of the apparatus, the apparatus is hidden from the observer and takes up no extra space in the show window or show case. The front, top and rear parts of the stand 75 are preferably closed by walls 82, 83 and 84 to shut out light to make the projected matter more pronounced.

In the modified form of the invention shown in Figs. 10 to 13, the construction of the casing 8' and lamp-housing 16', the location of the motor 44', the shaft 48', shaft 50', and the film feeding cylinder 29', is generally the same as in the first form shown in Figs. 1 to 10.

The housing 16' may be secured to the cross web 12' as in the preferred form. In the modified form the upper end 85 of the housing 16' is perforated at 85ª to provide vent holes and has a central large perforation in which a lamp 86 may be adjustably secured by any preferred means. The lower end 87 of the housing is removable and is of the form of a spoked wheel providing air passages between the spokes and the hub 88 providing a mounting for a stud secured therein as shown. The stud provides a bearing for a fan 89 to which is secured a beveled gear 90 meshing with a beveled gear 91 on a shaft 92 supported at one end in a bracket 93 projecting from the wall of the housing 16' and at its other end supported in the wall of said housing and projecting beyond it. On this end the shaft carries a beveled gear 94 in mesh with a beveled gear 95 on the motor shaft. By this means the fan will be rotated by the motor and the air will be forced through the housing drawing the cooler outside air into the housing and forcing it past the lamp 86.

The film feeding cylinder 29' is driven by the means shown in the preferred form and is preferably of the usual cylinder type of feed roll to feed a non-perforated film. Secured to and rotatable with the cylinder 29' is a gear 96 in mesh with a gear 97 suitably secured to a spring pressed pressure roller 98 supported as shown in Fig. 10. By means of the gears, the roller 98 acts as a feed roller as it is positively driven with the cylinder 29'. In other respects the modified form shown in Figs. 10 to 13 is substantially the same as that shown in Figs. 1 to 9.

While the invention has been described in detail with respect to certain particular preferred examples which give satisfactory results, it will be understood by those skilled in the art, after understanding the invention, that various changes and modifications may be made without departing from the spirit and scope of the invention, and it is intended therefore in the appended claims to cover all such changes and modifications.

What I claim is:

1. In a projecting apparatus comprising a main housing, a horizontal cross web in the housing, a motor on one side of the cross web, a film supported on the other side of the cross web, top and bottom cover plates constituting together with the main housing separate housings for the film and motor, said cross web and cover plates being provided with alined openings, and a lamp-housing mounted in said openings.

2. In a projecting apparatus comprising a main housing, a horizontal cross web in the housing, a motor on one side of the cross web, a film supported on the other side of the cross web, top and bottom cover plates constituting together with the main housing separate housings for the film and motor, said cross web and cover plates being provided with alined openings, a lamp-housing mounted in said openings, and means supporting said lamp-housing on said cross web.

3. In a projecting apparatus comprising a main housing provided with a lens receiving opening, a horizontal cross web in said housing having a depressed portion adjacent said lens receiving opening, and a lamp housing having a projecting beam tubular element resting on said depressed portion.

4. In a projecting apparatus comprising a main housing for a film and provided with alined openings through its walls, and a lamp housing mounted in said openings and provided with perforated ends located outside of said main housing and with imperforate side walls within the main housing except for the projecting beam opening.

5. In a projecting apparatus comprising a main housing, a lamp housing projecting through said main housing and provided with perforated ends, one of said ends being removable, a lamp supported on said removable end, a reflector supported on said lamp housing in rear of said lamp, and means for adjustably securing said removable end in position to adjust said lamp with respect to said reflector.

6. In a projecting apparatus comprising a main housing, a lamp housing projecting through said main housing and provided with perforated ends, a fan mounted in said lamp-housing, a motor mounted on the main housing, a shaft supported on the lamp-housing, and driving connections between the motor and shaft and the shaft and fan.

7. In a projecting apparatus comprising a main housing, a lamp housing projecting through said main housing and provided with perforated ends, the walls of said lamp housing being imperforate within the walls of the main housing, a lamp supported in one of said ends, a fan mounted in the other of said ends, a motor mounted in the main housing, and a driving connection between the motor and fan.

8. Projecting apparatus comprising a supporting housing, cover plates for opposite sides of said housing, said cover plates adapted to be opened respectively in opposite directions, film supporting and guiding means accessible upon opening one of said cover plates, motor drive means for moving said film accessible upon opening the other of said cover plates, and pivotal supporting means for said housing whereby the housing may be turned so that either of said cover plates may be made to face upwardly and convenient access may be had to the housing through either of said cover plate openings.

9. In a projecting apparatus comprising a main housing having opposed side walls, a lamp housing comprising an imperforate portion extending between the walls of said housing and having its ends resting in the openings of the walls of said main housing, the ends of said housing being perforated, one of said ends being removable, and a lamp supported on said removable end.

In testimony whereof I have signed my name to this specification.

WALTER J. BURCHETT.